United States Patent [19]

Gobran

[11] 3,976,606

[45] Aug. 24, 1976

[54] ADHESIVES TACKIFIED WITH LOW MOLECULAR WEIGHT TERPENE-PHENOLIC RESINS

[75] Inventor: Ramsis Gobran, Roseville, Minn.

[73] Assignee: Minnesota Mining and Manufacturing Company, St. Paul, Minn.

[22] Filed: Oct. 23, 1973

[21] Appl. No.: 408,591

[52] U.S. Cl. .............................. 260/4 AR; 428/261; 260/879; 260/62; 260/47 UA
[51] Int. Cl.² .................... C08L 7/00; C08L 9/00
[58] Field of Search ............... 260/62, 5, 47 UA, 3, 260/878 R, 4 AR, 879, 887; 428/261

[56] References Cited
UNITED STATES PATENTS

| | | | |
|---|---|---|---|
| 2,558,812 | 7/1951 | Bloch | 260/62 |
| 3,015,638 | 1/1962 | Sergi | 260/4 R |
| 3,197,326 | 7/1965 | Webber | 260/4 R |
| 3,251,808 | 5/1966 | Kaupp et al. | 260/62 |
| 3,347,935 | 10/1967 | Kaupp et al. | 260/619 B |
| 3,383,362 | 5/1968 | Gonzenbach | 260/62 |
| 3,408,253 | 10/1968 | Eickert | 260/62 |
| 3,491,167 | 1/1970 | Soldotos | 260/62 |
| 3,586,738 | 6/1971 | Weymann et al. | 260/890 |

FOREIGN PATENTS OR APPLICATIONS

1,694,829  3/1972  Germany

OTHER PUBLICATIONS

"Rubber World" p. 227 1968, Bill Publications, New York.

*Primary Examiner*—Joseph L. Schofer
*Assistant Examiner*—Peter F. Kulkosky
*Attorney, Agent, or Firm*—Alexander, Sell et al.

[57] ABSTRACT

Adhesive compositions having a high degree of adhesive tack are provided by certain rubbery materials which contain terpene-phenolic resins. The terpene phenolic resins are prepared by alkylating phenols with terpene hydrocarbons.

6 Claims, No Drawings

ADHESIVES TACKIFIED WITH LOW MOLECULAR WEIGHT TERPENE-PHENOLIC RESINS

BACKGROUND OF THE INVENTION

The present invention relates to tackified adhesive compositions, particularly to such compositions tackified with terpene-phenolic resin.

It has been the general practice in the manufacture of adhesives from elastomeric materials, such as natural rubber, polyisoprene, cis-butadiene, styrene-butadiene rubbers, ethylenepropylene rubbers, and the like, to mix with the elastomers, a tackifying agent sometimes merely called a tackifier. The tackifying agent is added to the elastomer to enable the normally weakly tacky or non-tacky elastomers to become tacky, i.e., to be capable of adhering to a surface with the application of very little or no pressure.

For the most part, the tackifiers for elastomers are rosin, modified rosins, polyterpene resins and courmarone-indene resins. Other resins of importance are the reaction products of alkylphenols with acetylene and the reaction products of phenols with aldehydes.

Of particular importance in the manufacture of adhesives from natural and synthetic rubbers has been the terpene resins, especially beta-pinene. The use of beta-pinene in the manufacture of tackifiers for adhesives has, however, been restricted because of its limited supply and because of the growing use of beta-pinene in other fields. This material has therefore been extended for use as a tackifier by reaction with phenols.

For example, U.S. Pat. No. 3,383,362 discloses reacting phenols with terpene, sesquiterpene, dihydroterpene or a low molecular weight propylene polymer and cyclic polyolefin to produce tackifiers which contain low molecular reactant by-products which will exude from an adhesive composition. Tackifiers from rosin, modified rosins, coumarone-indene resins and phenol condensation products with acetylene and aldehydes, furthermore have not adequately provided replacement for polyterpene resins because they have a variety of deficiencies. Some fail to produce a sufficiently high degree of tack; others are too expensive; and still others are chemically unstable.

SUMMARY OF THE PRESENT INVENTION

According to the present invention, it has been found that an unanticipated high degree of adhesive tack can be obtained in novel adhesive compositions comprised of certain rubbery materials, particularly natural rubber and polybutadienes, which are tackified with terpene-phenolic resins.

The adhesive compositions of the invention are relatively inexpensive to produce, chemically stable, and have an excellent balance of adhesion, cohesion, tackiness and strength. They provide superior adhesives for applying to backings, providing excellent pressure-sensitive adhesive tapes.

The terpene-phenolic tackifier resin is produced by alkylating a compound containing at least two phenolic groups with a terpene in the presence of a Friedel-Crafts catalyst. Such terpene-phenolic resin may be prepared by the method described in U.S. Pat. No. 3,347,935 or as hereinafter described.

Each compound having at least two phenolic groups (hereinafter merely called a "phenolic compound") should have, in each phenolic group, at least one ortho or para position free for alkylation by a terpene. Such compounds may be prepared by reacting certain phenols with dienes or trienes or by utilizing commercially available and well known compounds such as bisphenol A, bisphenol B, 4,4'-dihydroxydiphenyl ether and the like.

The compounds having at least two phenolic groups prepared by reaction of phenols with dienes or trienes may be prepared of phenols such as naphthol, cresol, tertiary butylphenol, octylphenol, nonylphenol, anisol, bisphenol, and di- or trisubstituted phenols having at least two free ortho or para positions such as 2,3-dimethyl phenol; 3,5-dimethyl phenol; 3,4-dimethyl phenol; 2,3,5-trimethyl phenol; etc. The dienes may be dicyclopentadiene, methylcyclopentadiene dimer, 1,5-cyclooctadiene, 1,5,9-cyclododecatriene, divinyl benzene, vinyl cyclohexene, dipentene, isoprene, butadiene, myrcene, and the like.

The molar ratio of phenol to diene or triene required to produce the intermediate phenolic compound may vary over a wide range. The best results are obtained when the molar ratio is on the order of 1.5 to 2 phenol to diene. The reaction of phenol with diene or triene may be carried out with a reaction medium such as an organic liquid which is inert with respect to the reactants and the product. The preferred medium to prepare this intermediate material is xylene. The reaction temperature to produce this intermediate material is in the range of 25°C to 130°C, although this may vary to higher or lower temperatures. The reaction is in the presence of a catalytic amount of a Friedel-Crafts catalyst, compounds providing such catalysts being hereinafter disclosed.

The terpenes that are suitable for use in the reaction to produce the terpene-phenolic resin tackifiers used in the invention may be of the monocyclic or bicyclic types and contain at least one ethylenic double bond. Such compounds will have the general formula $C_{10}H_{16}$ and include, d-limonene, 1-limonene, d,1-limonene, dipentene, terpinolene, alpha-terpine, beta-terpine, γ-terpine, silvestrene, carvestrene, alpha-pinene, beta-pinene, $\Delta^3$-carene and camphene. Mixtures of these terpenes may also be used for the reaction.

Suitable Friedel-Crafts catalysts for either of the reactions mentioned above include acids such as hydrofluoric acid, sulphuric acid, or phosphoric acid, or a Lewis acid such as aluminum chloride, aluminum bromide, boron trifluoride, boron trifluoride ether and acid complexes, beryllium chloride, ferric chloride, zinc chloride, and the like. Boron trifluoride and the ether and acid complexes thereof are the preferred catalysts.

The amount of catalyst required in the reaction to produce the tackifier resin, functionally stated, is that amount sufficient to cause the reaction to go to completion to produce the resin. This amount will generally be about 1–3% of the weight of the reactants and exclusive of the weight of the catalyst.

In the reaction, 2 to 4 moles of terpene should be employed for each mole of the phenolic compound.

The order of adding the reactants is important to produce the desired product. The phenolic compound should always be in an excess during the reaction so that the terpene reacts with it instead of forming a homopolymer which would act as an impurity, merely producing a blend of polyterpene and phenolic compound such as disclosed in aforementioned U.S. Pat. No. 3,383,362. An excess of phenolic compound can be maintained by charging the reaction vessel therewith, adding the catalyst, and then slowly adding the terpene with sufficient agitation to cause rapid dispersal.

The reaction can be carried out at atmospheric pressure but care should be taken to substantially exclude moisture, e.g., by purging the reaction vessel with a dry inert gas. The preferred reaction atmosphere is dry argon or nitrogen.

For convenience in handling and reaction control, the reactants may be mixed with an inert liquid reaction medium at about 10 to about 40 parts by weight reactants per 100 parts total (reaction medium plus reactants), preferably about 15 to 30 per 100. The preferred reaction medium is also a solvent for at least one of the reactants. Exemplary reaction media include aromatic hydrocarbons such as toluene and xylene, aliphatic hydrocarbons such as heptene and hexane, and halogenated hydrocarbons such as chlorobenzene and dichlorobenzene.

The reaction temperature is maintained preferably between room temperature (about 25°C) and 130°C, although slightly higher and slightly lower temperatures may be used. If the reaction temperature is much below 20°C, the reaction is too slow, and, at temperatures above 140°, some decomposition may occur.

The most convenient method of accomplishing the reaction is to charge the phenolic compound, the reaction medium, if used, and the catalyst into a suitable reaction vessel — and, with mixing, dropwise add the terpene. The reaction will be exothermic and care should be taken to maintain the reaction mixture at a temperature of less than about 130°C. Such a result can easily be accomplished by slow addition of the terpene or by cooling the reaction vessel contents. After the addition of the terpene is complete, heating at about 120°–140°C and agitation are continued until the reaction is complete. Reaction completion is generally achieved within 1 to 4 hours or less.

Once the reaction is complete, the product can be isolated, for example, by distillation of the catalyst, reaction medium, if used, unreacted materials, and low molecular weight products. Non-volatile catalysts or residues can be removed by methods known in the art, e.g., extraction, or they may be left in the product, if they are inert or can be rendered inert with respect to the materials with which they will eventually be used.

The terpene phenolic resins prepared as described above range in color from light amber to dark brown. The resin may be a viscous liquid, a tacky solid material, or a friable solid, or somewhere therebetween, depending upon the reactants going to produce it. The number average molecular weight of the resin will vary from about 400 to about 2,500 or more, also depending upon the starting materials.

The terpene-phenolic resins described can be blended with rubbery materials by using conventional rubber compounding equipment and techniques. Generally, about 5 to 200 parts by weight of the tackifier resin is used per 100 parts rubber (preferably 40 to 100 parts tackifier to 100 parts rubber).

The most preferred terpene-phenolic tackifier is partially or fully hydrogenated, since it will be even more compatible with a wider variety of rubbery materials to be tackified. In the partially hydrogenated tackifier resin, at least half, but not substantially all of the hydrogenatable carbon atoms are hydrogenated. The hydrogenatable carbon atoms are the olefinic carbon atoms and the carbon atoms bearing hydroxyl groups. Preferably from about 50 to 60% of the hydrogenatable carbon atoms are hydrogenated in the partially hydrogenated resin.

Hydrogenation can be achieved by well known techniques typically involving reacting the terpene-phenolic resin described above in a suitable hydrogenation reaction medium and a hydrogen atmosphere in a suitable pressure resistant vessel in the presence of a suitable hydrogenation catalyst. Hydrogenation temperatures can vary between about 50°C and 275°C although temperatures in the range of 100°C to 250°C are preferred. Hydrogen gas pressures from about 500 to about 4000 psig (preferably 1000 to 2500 psig) will produce an adequate rate of hydrogenation.

The hydrogenation reaction vessel should be capable of withstanding the hydrogenation temperature and the pressure and is constructed of a material that is non-reactive with the starting materials and product. Such vessels are generally made of stainless steel. The vessel should be fitted with a stirrer to agitate the reactants, a temperature sensing device to observe the hydrogenation reaction temperature, an inlet line with a valve to introduce hydrogen into the vessel, and exhaust line with a valve to vent the vessel after the hydrogenation reaction is completed, and a pressure-sensing device to observe the hydrogen pressure.

Hydrogenation is achieved by first purging the hydrogenation vessel with a dry inert gas as dry nitrogen and then charging it with the terpene-phenolic resin described above, reaction medium, and catalyst, sealing the vessel, commencing stirring, pressurizing the vessel with hydrogen, heating to the appropriate temperature, and continuing to heat and stir the vessel until the reaction is completed. The time required is generally about 2 to 24 hours but this may vary. Partial hydrogenation may be achieved at shorter hydrogenation times, for example, 0.1 to 3 hours, while substantially complete hydrogenation requires longer reaction times.

Useful hydrogenation reaction media include saturated hydrocarbon liquids such as cyclohexane, heptane, and the like. The weight ratio of reaction medium to terpene phenolic resin will generally be from about 1:1 to 10:1 or higher. The preferred hydrogenation catalyst is Raney nickel, although others may be useful, for example, platinum, ruthenium, nickel complexes with aluminum, e.g., nickel 2-hexonate/diethyl aluminum reaction product, and amines, etc.

The substantially completely hydrogenated product is extremely compatible with and will tackify natural rubbers such as milled pale crepe natural rubber, cis-polybutadiene rubber such as that sold under the trade designation "Ameripol CB220".

EXAMPLE 1

A 5-neck, 2 liter resin flask, fitted with a mechanical stirrer, a dropping funnel, a thermometer, a purge gas inlet, and a reflux condenser protected from the atmosphere by a calcium chloride drying tube, was first purged with dry argon to eliminate atmospheric contamination, and the gas flow thereafter maintained at a rate sufficient to preclude such contamination. One mole (94 grams) of phenol was then charged into the flask and heated therein until it completely melted. Thereafter, 1.5 ml $BF_3(CH_3COOH)_2$ was added in one batch with sufficient agitation to produce a homogeneous mixture. Next, half a mole (66 grams) of dicyclopentadiene was slowly added with the dropping funnel over a 1 hour period of time, maintaining the resultant exotherm to about 110° – 120°C. Upon completion of the addition of the dicyclopentadiene, the contents of the flask were heated to 130°C for an additional 3 hours with stirring. To the resultant viscous dark brown mass was added 180 ml of xylene. The temperature was reduced to 100°C and then 1.5 ml of the $BF_3(CH_3COOH)_2$ was added, followed by the dropwise addition of 2 moles (272 grams) of molten camphene. The camphene was added through the dropping funnels over a period of 1½ hours, maintaining the reaction temperature at 100°C. After complete addition of the camphene, the flask contents were heated for an additional 3 hours with stirring at 130°C. Thereafter, the reaction mixture was allowed to cool to room temperature (about 23°C) over night (about 12 hours).

The following morning, the solvent, catalyst, unreacted material, and low boiling oils were distilled off at a pressure of about 2–3 mm of mercury with heating to 240°C, leaving 385 grams of a dark brown resin which solidified when it was poured from the flask. The resin was found to have a glass transition temperature of 77°C and a weight average molecular weight of 1370 and a number average molecular weight of 650.

The number average molecular weight and weight average molecular weight were determined by gel permeation chromatography utilizing a "Waters Associates and Company" gel permeation chromatograph. The glass transition temperature was determined by differential thermal analysis using an "E. I. DuPont de Nemours Co." differential thermal analysis device by the method described by Mauer in *Chemical Rubber and Technology*, v. 42, No. 1 (1969), the chapter entitled "Applications of Differential Thermal Analysis and Thermogravimetric Analysis to Elastomer Systems".

EXAMPLE 2

Into a 3 liter resin flask fitted and purged as described in Example 1 was placed 1½ moles (342 grams) of bisphenol A, 225 ml of xylene, and 10 ml of $BF_3(CH_3COOH)_2$. This mixture was heated to 110°C and then 6 moles (816 grams) of molten camphene was added dropwise, maintaining the reaction temperature at about 130°C. After complete addition of the camphene, the reaction contents were heated at 130°C for an additional 3 hours, with stirring. Thereafter, the solvent, catalyst, unreacted materials, and low boiling oils were removed under reduced pressure leaving 680 grams of a dark brown resinous product which had a glass transition temperature of 40°C, number average molecular weight of 450 and weight average molecular weight of 490.

EXAMPLES 3–14

Following the procedures described in either Example 1 or Example 2, the following Examples were prepared and analysed for weight, and glass transition temperature. The results are shown in Table 1 below:

TABLE 1

| Example No. | | Molar Ratio | $\overline{M}w$ | $\overline{M}n$ | Tg (°C) |
|---|---|---|---|---|---|
| 3 | Phenol/DCPD[1]/Δ[3] carene | 2/1/4 | 1,910 | 800 | 47 |
| 4 | Phenol/cyclooctadiene/camphene | 2/1/4 | 490 | 410 | 15 |
| 5 | Phenol/dipentene/camphene | 2/1/4 | 490 | 430 | 27 |
| 6 | p-t-butylphenol/DCPD[1]/camphene | 2/1/2 | 940 | 660 | 50 |
| 7 | Phenol/myrcene/camphene | 2/1/4 | 540 | 480 | 46 |
| 8 | p-Cresol/DCPD[1]/camphene | 2/1/2 | 1,210 | 790 | 88 |
| 9 | Anisole/DCPD[1]/camphene | 2/1/4 | 480 | 350 | 1 |
| 10 | Phenol/vinyl cyclohexene/camphene | 2/1/4 | 580 | 490 | 47 |
| 11 | Phenol/isoprene/camphene | 2/1/4 | 720 | 600 | 44 |
| 12 | Phenol/1,5,9-cyclododecatriene/camphene | 3/1/6 | 670 | 520 | 42 |
| 13 | Phenol/methylcylopentadiene dimer/camphene | 2/1/4 | 810 | 560 | 48 |
| 14 | Phenol/DCPD[1]/camphene | 2/1/3 | 1,420 | 950 | 84 |

[1]Dicyclopentadiene

Hydrogenated resins according to the invention were prepared by dissolving the resins described in Examples 1–14 at 20% solids in cyclohexane, charging the solution into a stainless steel hydrogenation reactant vessel fitted with a thermocouple, pressure gauge, stirrer, hydrogen gas inlet, and exhaust valve, adding Raney nickel catalyst (0.1 g per gram of resin), sealing the vessel, and pressurizing with about 1200–2500 psi of hydrogen gas. Thereafter, the reaction vessel was heated to about 250°C with stirring to produce the desired degree of hydrogenation. Hydrogenated products, Examples 15–28, are shown in Table 2 below.

TABLE 2

| Ex. No. | Resin | $\overline{M}w$ | $\overline{M}n$ | Tg (°C) |
|---|---|---|---|---|
| 15 | Phenol/DCPD[1]/camphene | 1,640 | 810 | 31 |
| 16 | Bisphenol-A/camphene | 497 | 403 | −17 |
| 17 | Phenol/DCPD[1]/Δ[3] carene | 1,730 | 760 | 28 |
| 18 | Phenol/cyclooctadiene/camphene | 420 | 360 | −14 |
| 19 | Phenol/dipentene/camphene | 450 | 390 | −10 |
| 20 | p-t-butylphenol/DCPD[1]/camphene | 615 | 475 | 11 |
| 21 | Phenol/myrcene/camphene | 580 | 490 | 16 |
| 22 | p-Cresol/DCPD/camphene | 993 | 682 | 24 |
| 23 | Anisole/DCPD/camphene | 460 | 370 | −4 |
| 24 | Phenol/vinyl cyclohexene/camphene | 535 | 460 | 15 |
| 25 | Phenol/isoprene/camphene | 638 | 500 | 8 |
| 26 | Phenol/1,5,9-cyclododecatriene/camphene | 595 | 465 | 1 |
| 27 | Phenol/methylcyclopentadiene dimer/camphene | — | — | 14 |
| 28 | Phenol/DCPD/camphene | — | — | 46 |

[1]Dicyclopentadiene

The terpene-phenolic resins described in the previous Examples were evaluated as tackifiers in pressure sensitive adhesive compositions for adhesive coated tapes by dissolving the resin in a solvent such as heptane and then dissolving a rubber base material in the resin solution to form a homogeneous blend, forming approximately a 20% solids solution therein, and coating the solution on 1 mil polyester film to provide a dried coating thickness of 2 mils. Thereafter, the coated film as examined and subjective evaluation of film appearance, quality of film, and tack were determined.

In an adhesive coated transparent tape, it is desired to have a clear rather than a hazy film appearance. Likewise, the film should not be cracked or show other signs of discontinuity. Additionally, the pressure sensitive adhesive should be tacky without being unduly soft.

The terms "tacky", "some tack" and "nil" relate to the degree of tack noted when a hand-held 1.6 mm diameter stainless steel probe was tacked to the surface of a 4 by 6 inch by 1 mil adhesive layer on a 1 mil polyester sheet, as the probe is withdrawn. Tacky means the entire sheet was lifted and remained on the end of the probe. Some was means the sheet was lifted slightly but it subsequently fell off the end of the probe. Nil means the sheet was not lifted by the probe. (Comparison with tack measurements determined by ASTM Method D2979-71 reveals adhesives found to be tacky by the above-described test have withdrawal force values from 35 to 110 grams.)

The subjective evaluations of the pressure sensitive adhesives are shown in Table 3 below.

TABLE 3

| Ex. No. | Rubber Base Material | Resin Ex. No. | Amount of Resin (as Parts Resin per 100 Parts Rubber) | Film Appearance | Quality of Film | Tack |
|---|---|---|---|---|---|---|
| 29 | natural rubber | 1 | 30 | clear orange tint | good | some tack |
| 30 | '' | 1 | 40 | '' | '' | tacky |
| 31 | '' | 1 | 50 | '' | '' | '' |
| 32 | cis-polybutadiene | 1 | 30 | '' | '' | '' |
| 33 | '' | 1 | 40 | '' | '' | '' |
| 34 | '' | 1 | 50 | '' | '' | '' |
| 35 | natural rubber | 2 | 30 | trans. yellow tint | '' | '' |
| 36 | '' | 2 | 40 | '' | '' | '' |
| 37 | '' | 2 | 50 | '' | '' | '' |
| 38 | cis-polybutadiene | 2 | 30 | '' | rough | '' |
| 39 | '' | 2 | 40 | '' | '' | '' |
| 40 | '' | 2 | 50 | '' | good | '' |
| 41 | natural rubber | 3 | 30 | red and clear | '' | '' |
| 42 | '' | 3 | 40 | '' | '' | '' |
| 43 | '' | 3 | 50 | '' | '' | '' |
| 44 | cis-polybutadiene | 3 | 30 | red and clear | rough | tacky |
| 45 | '' | 3 | 40 | '' | good | '' |
| 46 | '' | 3 | 50 | '' | '' | '' |
| 47 | natural rubber | 4 | 30 | clear yellow tint | '' | '' |
| 48 | '' | 4 | 40 | '' | '' | '' |
| 49 | '' | 4 | 50 | '' | '' | '' |
| 50 | cis-polybutadiene | 4 | 30 | '' | rough | '' |
| 51 | '' | 4 | 40 | '' | '' | '' |
| 52 | '' | 4 | 50 | '' | '' | '' |
| 53 | natural rubber | 5 | 30 | trans. yellow tint | good | '' |
| 54 | '' | 5 | 40 | '' | '' | '' |
| 55 | '' | 5 | 50 | '' | '' | '' |
| 56 | cis-polybutadiene | 5 | 30 | '' | rough | '' |
| 57 | '' | 5 | 40 | '' | good | '' |
| 58 | '' | 5 | 50 | '' | '' | '' |
| 59 | natural rubber | 6 | 30 | trans. yellow tint | good | tacky |
| 60 | '' | 6 | 40 | '' | '' | '' |
| 61 | '' | 6 | 50 | '' | '' | '' |
| 62 | cis-polybutadiene | 6 | 30 | '' | '' | '' |
| 63 | '' | 6 | 40 | '' | '' | '' |
| 64 | '' | 6 | 50 | '' | '' | '' |
| 65 | natural rubber | 7 | 30 | '' | '' | '' |
| 66 | '' | 7 | 40 | '' | '' | '' |
| 67 | '' | 7 | 50 | '' | '' | '' |
| 68 | cis-polybutadiene | 7 | 30 | '' | '' | '' |
| 69 | '' | 7 | 40 | '' | '' | '' |
| 70 | '' | 7 | 50 | '' | rough | '' |
| 71 | natural rubber | 8 | 30 | trans. colorless | good | '' |
| 72 | '' | 8 | 40 | '' | '' | '' |
| 73 | '' | 8 | 50 | '' | '' | '' |
| 74 | cis-polybutadiene | 8 | 30 | trans. colorless | good | tacky |
| 75 | '' | 8 | 40 | '' | rough | '' |
| 76 | '' | 8 | 50 | '' | good | '' |
| 77 | natural rubber | 9 | 30 | trans. yellow | '' | '' |
| 78 | '' | 9 | 40 | '' | '' | '' |
| 79 | '' | 9 | 50 | '' | '' | '' |
| 80 | cis-polybutadiene | 9 | 30 | '' | rough | '' |
| 81 | '' | 9 | 40 | '' | '' | '' |
| 82 | '' | 9 | 50 | '' | good | '' |
| 83 | natural rubber | 10 | 30 | trans. yellow tint | '' | '' |
| 84 | '' | 10 | 40 | '' | '' | '' |
| 85 | '' | 10 | 50 | '' | '' | '' |
| 86 | cis-polybutadiene | 10 | 30 | '' | '' | '' |
| 87 | '' | 10 | 40 | '' | '' | '' |
| 88 | '' | 10 | 50 | '' | '' | '' |
| 89 | natural rubber | 11 | 30 | trans. yellow tint | good | tacky |
| 90 | '' | 11 | 40 | '' | '' | '' |
| 91 | '' | 11 | 50 | '' | '' | '' |
| 92 | cis-polybutadiene | 11 | 30 | '' | rough | '' |
| 93 | '' | 11 | 40 | '' | '' | '' |
| 94 | '' | 11 | 50 | '' | good | '' |
| 95 | natural rubber | 12 | 30 | '' | '' | '' |
| 96 | '' | 12 | 40 | '' | '' | '' |
| 97 | '' | 12 | 50 | '' | '' | '' |
| 98 | cis-polybutadiene | 12 | 30 | '' | '' | '' |
| 99 | '' | 12 | 40 | '' | rough | '' |
| 100 | '' | 12 | 50 | '' | '' | '' |
| 101 | natural rubber | 13 | 30 | trans. yellow orange | good | '' |
| 102 | '' | 13 | 40 | '' | '' | '' |

TABLE 3-continued

| Ex. No. | Rubber Base Material | Resin Ex. No. | Amount of Resin (as Parts Resin per 100 Parts Rubber) | Film Appearance | Quality of Film | Tack |
|---|---|---|---|---|---|---|
| 103 | " | 13 | 50 | " | " | " |
| 104 | cis-polybutadiene | 13 | 30 | trans. yellow-orange | good | tacky |
| 105 | " | 13 | 40 | | rough | " |
| 106 | " | 13 | 50 | " | good | " |
| 107 | natural rubber | 14 | 30 | trans. clear | " | " |
| 108 | " | 14 | 40 | " | " | " |
| 109 | " | 14 | 50 | " | " | " |
| 110 | cis-polybutadiene | 14 | 30 | slight haze colorless | " | " |
| 111 | " | 14 | 40 | slight haze orange tint | lines | " |
| 112 | " | 14 | 50 | hazy orange | crinkle | some tack |
| 113 | natural rubber | 15 | 30 | clear trans. | good | tacky |
| 114 | " | 15 | 40 | " | " | " |
| 115 | " | 15 | 50 | " | " | " |
| 116 | cis-polybutadiene | 15 | 30 | " | " | " |
| 117 | " | 15 | 40 | " | " | " |
| 118 | " | 15 | 50 | " | " | " |
| 119 | natural rubber | 16 | 30 | trans. clear | good | tacky |
| 120 | " | 16 | 40 | " | " | " |
| 121 | " | 16 | 50 | " | " | " |
| 122 | cis-polybutadiene | 16 | 30 | " | " | " |
| 123 | " | 16 | 40 | " | " | " |
| 124 | " | 16 | 50 | " | " | " |
| 125 | natural rubber | 17 | 30 | " | " | " |
| 126 | " | 17 | 40 | " | " | " |
| 127 | " | 17 | 50 | " | " | " |
| 128 | cis-polybutadiene | 17 | 30 | " | rough | " |
| 129 | " | 17 | 40 | " | " | " |
| 130 | " | 17 | 50 | " | good | " |
| 131 | natural rubber | 18 | 30 | " | " | " |
| 132 | " | 18 | 40 | " | " | " |
| 133 | " | 18 | 50 | " | " | " |
| 134 | cis-polybutadiene | 18 | 30 | trans. clear | rogh | tacky |
| 135 | " | 18 | 40 | " | " | " |
| 136 | " | 18 | 50 | " | good | " |
| 137 | natural rubber | 19 | 30 | " | " | " |
| 138 | " | 19 | 40 | " | " | " |
| 139 | " | 19 | 50 | " | " | " |
| 140 | cis-polybutadiene | 19 | 30 | " | " | " |
| 141 | " | 19 | 40 | " | rough | " |
| 142 | " | 19 | 50 | " | " | " |
| 143 | natural rubber | 20 | 30 | " | good | " |
| 144 | " | 20 | 40 | " | " | " |
| 145 | " | 20 | 50 | " | " | " |
| 146 | cis-polybutadiene | 20 | 30 | " | " | " |
| 147 | " | 20 | 40 | " | rough | " |
| 148 | " | 20 | 50 | " | " | " |
| 149 | natural rubber | 21 | 30 | trans. clear | good | tacky |
| 150 | " | 21 | 40 | " | " | " |
| 151 | " | 21 | 50 | " | " | " |
| 152 | cis-polybutadiene | 21 | 30 | " | rough | " |
| 153 | " | 21 | 40 | " | " | " |
| 154 | " | 21 | 50 | " | " | " |
| 155 | natural rubber | 22 | 30 | " | good | " |
| 156 | " | 22 | 40 | " | " | " |
| 157 | " | 22 | 50 | " | " | " |
| 158 | cis-polybutadiene | 22 | 30 | " | rough | " |
| 159 | " | 22 | 40 | " | " | " |
| 160 | " | 22 | 50 | " | " | " |
| 161 | natural rubber | 23 | 30 | " | good | " |
| 162 | " | 23 | 40 | " | " | " |
| 163 | " | 23 | 50 | " | " | " |
| 164 | cis-polybutadiene | 23 | 30 | trans. clear | rough | tacky |
| 165 | " | 23 | 40 | " | " | " |
| 166 | " | 23 | 50 | " | good | " |
| 167 | natural rubber | 24 | 30 | " | " | " |
| 168 | " | 24 | 40 | " | " | " |
| 169 | " | 24 | 50 | " | " | " |
| 170 | cis-polybutadiene | 24 | 30 | " | " | " |
| 171 | " | 24 | 40 | " | rough | " |
| 172 | " | 24 | 50 | " | " | " |
| 173 | natural rubber | 25 | 30 | " | good | " |
| 174 | " | 25 | 40 | " | " | " |
| 175 | " | 25 | 50 | " | " | " |
| 176 | cis-polybutadiene | 25 | 30 | " | rough | " |
| 177 | " | 25 | 40 | " | " | " |
| 178 | " | 25 | 50 | " | " | " |
| 179 | natural rubber | 26 | 30 | trans. clear | good | tacky |
| 180 | " | 26 | 40 | " | " | " |
| 181 | " | 26 | 50 | " | " | " |
| 182 | cis-polybutadiene | 26 | 30 | " | " | " |
| 183 | " | 26 | 40 | " | " | " |
| 184 | " | 26 | 50 | " | " | " |
| 185 | natural rubber | 27 | 30 | " | " | " |
| 186 | " | 27 | 40 | " | " | " |
| 187 | " | 27 | 50 | " | " | " |
| 188 | cis-polybutadiene | 27 | 30 | " | " | " |
| 189 | " | 27 | 40 | " | " | " |
| 190 | " | 27 | 50 | " | " | " |
| 191 | natural rubber | 28 | 30 | | | |

TABLE 3-continued

| Ex. No. | Rubber Base Material | Resin Ex. No. | Amount of Resin (as Parts Resin per 100 Parts Rubber) | Film Appearance | Quality of Film | Tack |
|---|---|---|---|---|---|---|
| 192 | " | 28 | 40 | " | " | " |
| 193 | " | 28 | 50 | " | " | " |
| 194 | cis-polybutadiene | 28 | 30 | trans. clear | good | tacky |
| 195 | " | 28 | 40 | " | ripple | " |
| 196 | " | 28 | 50 | " | cracks | " |

"trans." is the abbreviation of "transparent"

What is claimed is:

1. A tacky adhesive composition suited for use as the adhesive for pressure-sensitive adhesive tape comprising
   1. 5 to 200 parts by weight terpene-phenolic resin having a number average molecular weight between about 400 and about 3500, said resin being produced by reacting, in an inert atmosphere, in the presence of a Friedel-Crafts catalyst and at a temperature in the range of about 20°C – 130°C, 2 to 4 moles of terpene with one mole of a compound containing at least two phenolic groups, each of said groups having at least one ortho or para position free for alkylation by said terpene, wherein said compound having at least two phenolic grops is selected from the group consisting of bisphenol A, bisphenol B, 4,4'-dihydroxydiphenyl ether, and compounds produced by reacting about 2 moles of a phenol with about 1 mole of a diene or triene and;
   2. about 100 parts by weight of a rubbery material selected from the group consisting of natural rubber and cis-polybutadiene.

2. An article comprising a flexible self-supporting strip bearing a thin layer of the tacky adhesive composition of claim 1 on at least one surface thereof.

3. The tacky adhesive composition of claim 1 wherein at least half of the olefinic carbon atoms and carbon atom bearing hydroxy groups of said resin are hydrogenated.

4. An article comprising a flexible self-supporting strip bearing a thin layer of the tacky adhesive composition of claim 3 on one major surface thereof.

5. The tacky adhesive composition of claim 1 wherein said resin is the reaction product of phenol, dicyclopentadiene, and camphene.

6. The adhesive composition of claim 5 wherein said reaction product is at least partially hydrogenated.

* * * * *

UNITED STATES PATENT OFFICE
CERTIFICATE OF CORRECTION

Patent No. 3,976,606     Dated August 24, 1976

Inventor(s) Ramsis Gobran

It is certified that error appears in the above-identified patent and that said Letters Patent are hereby corrected as shown below:

Column 6, line 66, "as" should read -- was --.

Column 8, line 2, "Some was" should read -- Some tack --.

Claim 1, line 14, "grops" should read -- groups --.

Signed and Sealed this

Twenty-third Day of November 1976

[SEAL]

Attest:

RUTH C. MASON
Attesting Officer

C. MARSHALL DANN
Commissioner of Patents and Trademarks